Sept. 29, 1970   D. SCARAMUCCI   3,531,082
BUTTERFLY VALVE ASSEMBLY
Filed April 17, 1969   2 Sheets-Sheet 2
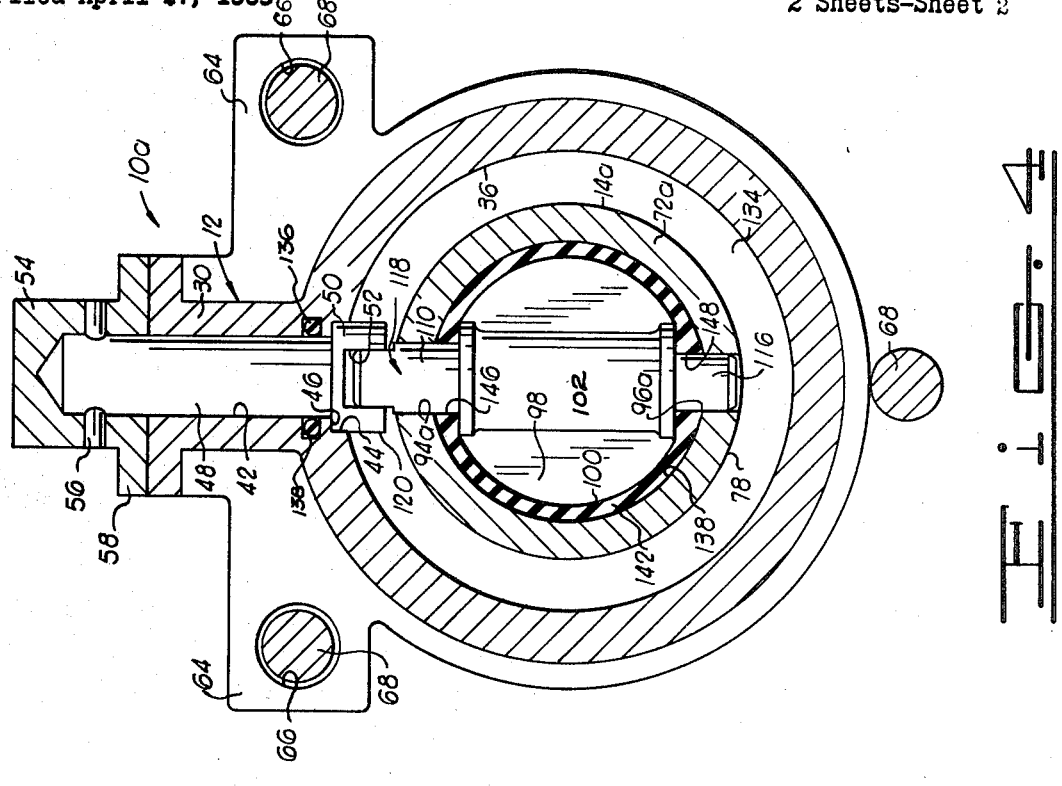
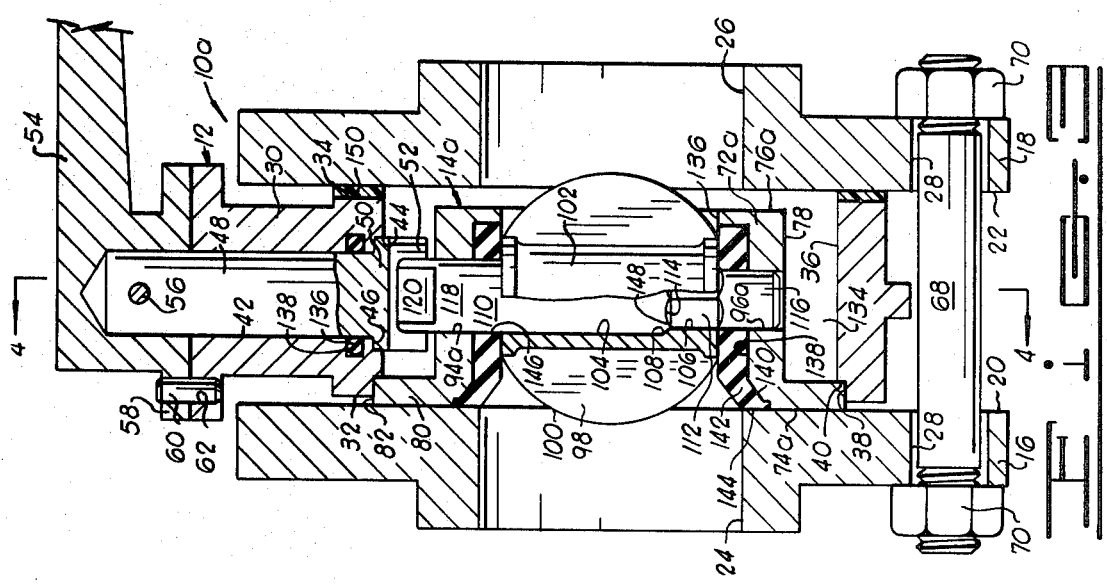
INVENTOR.
DOMER SCARAMUCCI
BY
*Dunlap, Laney, Hessin & Dougherty*
ATTORNEYS

United States Patent Office 3,531,082
Patented Sept. 29, 1970

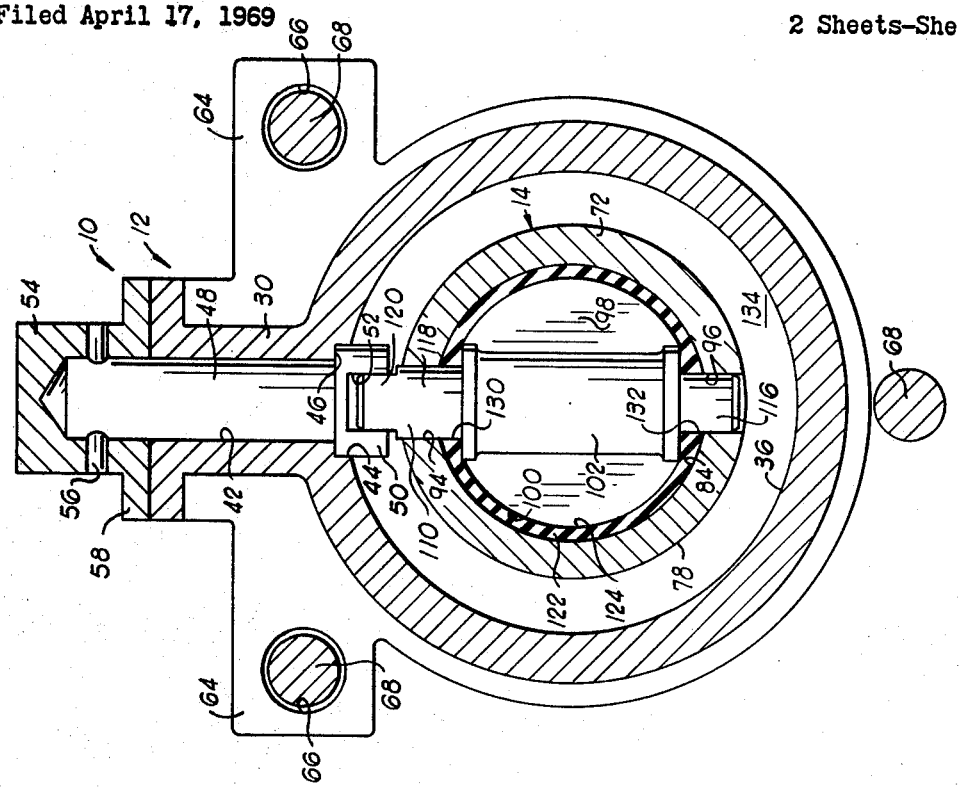

3,531,082
BUTTERFLY VALVE ASSEMBLY
Domer Scaramucci, 3245 S. Hattie,
Oklahoma City, Okla. 73129
Continuation-in-part of application Ser. No. 763,644,
Sept. 30, 1968. This application Apr. 17, 1969, Ser. No. 818,185
Int. Cl. F16k 1/22
U.S. Cl. 251—151      22 Claims

ABSTRACT OF THE DISCLOSURE

A butterfly valve assembly, particularly useful between flanges, which utilizes a housing unit and a separate valve unit. The housing unit and the valve unit are adapted so that a minimum contact area is established therebetween. The housing unit provides a supporting housing adapted to be supported between the flanges, and includes a valve operator and a first valve stem. The valve unit is sized to be inserted in the housing unit and includes a butterfly valve member, seats and a second valve stem. The second valve stem is interconnected to the first valve stem, and is insertable and removable through the valve body and through the butterfly valve member, and is journalled in the valve body. The second valve stem is interconnected to the butterfly valve member so that the turning movement of the first valve stem is transmitted to the butterfly valve member.

CROSS-REFERENCE TO RELATED APPLICATION

This application is a continuation-in-part of applicant's co-pending application entitled "Valve Assembly With Insertable Valve Unit," Ser. No. 763,644, filed Sept. 30, 1968.

BACKGROUND OF THE INVENTION

Field of the invention

This invention relates generally to improvements in valve assemblies utilizing a housing unit and a separate valve unit, and more particularly, but not by way of limitation, to an improved butterfly valve assembly utilizing a housing unit and a separate valve unit.

DESCRIPTION OF THE PRIOR ART

Applicant's co-pending application, "Valve Assembly With Insertable Valve Unit," Ser. No. 763,644, filed Sept. 30, 1968, disclosed a butterfly valve assembly having a separate housing unit and a separate valve unit. In that disclosure the butterfly valve member was journaled in the valve body using two separate valve stems. The valve unit was insertable in the housing unit, the outer periphery of the valve body being sized to slidingly fit in the housing. There are applications, particularly those involving the control of corrosive fluids, or those where the valve is to be used in a corrosive atmosphere, where it is desirable to maintain the contacting area between the valve unit and the housing to a minimum.

SUMMARY OF THE INVENTION

The present invention contemplates, in one aspect thereof, a valve assembly for controlling the flow of fluid between a pair of aligned pipe flanges interconnected by a plurality of circumferentially spaced bolts. The valve assembly includes a housing having opposite end faces, a bore extending therethrough and adapted to be supported between the flanges by the bolts. A valve operator is supported by the housing. A valve unit is supported in the housing, and includes a valve body which is adapted to be inserted lengthwise into the housing. The valve body has opposite ends and a bore extending therethrough intersecting the opposite ends. The outer periphery of the valve body is sized to be less than the inner periphery formed by the bore in the housing, so that when the valve body is inserted in the housing a chamber will exist between the valve body and the housing. A butterfly valve member is supported in the bore of the valve body for opening and closing the valve assembly. A valve stem is connected to the butterfly valve member, and has an upper and lower end portion thereof journaled in the valve body. The upper end portion is adapted to be connected to the valve operator for transmitting the movement of the valve operator to the butterfly valve member. A seat is provided to form a seal between the valve body and the butterfly valve member when the butterfly vlave member is in the closed position.

An object of the invention is to facilitate the repair of valve assemblies in the field.

Another object of this invention is to provide a butterfly valve assembly wherein the cost of manufacture and assemble the parts of the valve assembly is reduced to a minimum, and the valve assembly will have a long service life.

A further object of the invention is to provide a butterfly valve assembly wherein the butterfly valve member is positively located and journaled in the valve chamber by a single valve stem.

A still further object of the invention is to provide a butterfly valve assembly wherein the butterfly valve member may be quickly and easily removed by the removal of a single valve stem.

One further object of the invention is to provide a butterfly valve assembly having a separate, insertable valve unit which has a chamber between the valve body and the housing, and is therefore suitable as a steam jacketed valve.

Another object of the invention is to provide a valve assembly having an insertable valve unit, wherein the contact area between the housing unit and the valve unit is reduced to a minimum to facilitate insertion and removal of the valve unit.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view of a valve assembly, assembled between two flanges.

FIG. 2 is a sectional view of the valve assembly of FIG. 1, taken substantially along the lines 2—2 of FIG. 1.

FIG. 3 is a view similar to FIG. 1, but illustrating a modified valve assembly.

FIG. 4 is a view of the valve assembly of FIG. 3, taken substantially along the lines 4—4 of FIG. 3.

DESCRIPTION OF THE PREFERRED EMBODIMENTS

Referring to the drawings in detail, and to FIGS. 1 and 2 in particular, shown therein and designated by the general reference character 10, is a valve assembly constructed in accordance with the invention. The valve assembly 10 basically comprises a housing unit 12 and a valve unit 14, and as shown more clearly in FIG. 1, the valve assembly 10 is disposed generally between a pair of flanges 16 and 18.

Each of the flanges 16 and 18 includes an end face 20 and 22, and a threaded opening 24 and 26, respectively. The threaded openings 24 and 26 are axially aligned and sized to receive the threaded ends of adjacent sections of a conduit (not shown). Each of the flanges 16 and 18 also includes a plurality of circumferentially spaced apertures 28 extending therethrough.

The housing unit 12 includes a tubular housing 30 having opposite end faces 32 and 34 and a bore 36 extending therethrough. A counterbore 38 is formed in the end 32 of the housing 30, thereby providing an annular wall 40 facing the respective end of the housing 30.

An aperture 42 extends transversely through the housing 30 intersecting the bore 36. A counterbore 44 is formed in the aperture 42 adjacent the bore 36 of the housing 30, thereby providing a downwardly facing surface 46 in the housing 30.

A first valve stem 48 is journaled in the housing 30, and extends through the transversely extending aperture 42. Thus the center line of the first valve stem 48 extends at a right angle to the center line of the bore 36 in the housing 30. The first valve stem 48 includes a lower flange portion 50 that engages the downwardly facing surface 46 in the housing 30, encircling the aperture 42, to limit the upward movement of the first valve stem 48 in the aperture 42. A slot 52 is formed in the lower or inner end of the flange portion 50 of the first valve stem 48, for reasons which will become more apparent hereinafter.

A handle 54 is connected to the upper end of the first valve stem 48 by a pin 56. The handle 54 includes a flange portion 58 that is engageable with a pair of stop pins 60 (only one is shown) to limit the rotational movement of the handle 54 to approximately 90 degrees. The stop pins 60 are disposed in a pair of holes 62 (only one is shown) in the housing 30. As may be observed in FIGS. 1 and 2, the handle 54, and more particularly the flange portion 58 thereof, will limit the downward movement of the first valve stem 48 in the aperture 42.

A pair of flanges 64 extend outwardly from the housing 30, and two bolt holes 66 are provided extending therethrough.

The housing unit 12, the valve unit 14 and the flanges 16 and 18 are held in assembled relationship by a plurality of threaded bolts 68. In an assembled position, as shown in FIGS. 1 and 2, two of the bolts 68 will extend through the apertures 28 in the flanges 16 and 18, and through the bolt holes 66 in the housing 30, and the remaining bolts 68 will extend around the outer periphery of the housing 30. Each of the bolts 68 is provided with a pair of threaded nuts 70 that engage the flanges 16 and 18, thereby securing the valve assembly 10 in the assembled position.

The valve unit 14 includes a valve body 72, having opposite ends 74 and 76, and having an outer periphery 78 sized to be less in diameter than the inner periphery formed by the bore 36 in the housing 30, for reasons which will be made more apparent hereinafter. The valve body 72 also includes a flange portion 80 formed on the outer periphery 78 adjacent the end 74 of the valve body 72. The flange portion 80 has an end face 81 and an outer periphery 82. The end face 81 is coplanar with the end face 74 of the valve body 72, and the outer periphery 82 is sized to slidingly fit in the counterbore 38 of the housing 30.

The length of the valve body 72, as measured from the end 74 axially to the end 76, is slightly greater than the length of the housing 30, as measured from the end 32 axially to the end 34. As shown in FIG. 1, the length of the valve body 72 is sized such that when the valve unit 14 is in the assembled position, the end 76 of the valve body 72 is coplanar with the end 34 of the housing 30, and the flange portion 80 of the valve body 72 is sized with respect to the counterbore 38 in the housing 30, such that the end faces 74 and 81 of the valve body 72 and the flange portion 80, respectively, will extend axially beyond the end face 32 of the housing 30.

A bore 84 extends through the valve body 72 intersecting the end faces 74 and 76 thereof. Counterbores 86 and 88 are formed in the valve body 72 adjacent the end faces 74 and 76, respectively. A chamfered portion 90 is formed in the valve body 72 between the counterbore 86 and the bore 84 and a similar chamfer 92 is formed in the valve body 72 between the counterbore 88 and the bore 84.

Upper and lower apertures 94 and 96 are formed transversely through the valve body 72 intersecting the bore 84. In a preferred form, as shown in FIGS. 1 and 2, the upper and lower apertures 94 and 96 are in alignment, for reasons which will be made more apparent hereinafter.

A disc or butterfly valve member 98, having an outer periphery 100, is movably disposed in the bore 84 of the valve body 72. The butterfly valve member 98 includes a cylindrical boss portion 102 which extends radially across the diameter of the butterfly valve member 98. A bore 104 extends through the boss portion 102, and as shown more clearly in FIG. 1, a portion 106 of the bore 104 has a generally hexagonally shaped cross section of reduced diameter. The hexagonally shaped portion 106 of the bore 104 forms an upwardly facing surface 108 which encircles the inner periphery of the bore 104, for reasons which will be made more apparent hereinafter.

A second valve stem 110 extends downwardly through the upper aperture 94 in the valve body 72, through the bore 104 of the butterfly valve member 98, and through the lower aperture 96 of the valve body 72. A portion 112 of the second valve stem 110 is shaped to have a generally hexagonally shaped cross section, and is sized to matingly fit in the hexagonally shaped portion 106 of the bore 104. The hexagonally shaped portion 112 of the second valve stem 110 forms a downwardly facing surface 114 encircling the second valve stem 110. In an assembled position, as shown in FIG. 1, the downwardly facing surface 114 of the second valve stem 110 will engage the upwardly facing surface 108 in the bore 104, thereby limiting the downward movement of the second valve stem 110 in the bore 104.

The length of the second valve stem 110 is sized such that in an assembled position the lower portion 116 of the second valve stem 110 will extend through the lower aperture 96 of the valve body 72, and is journaled therein. The upper portion 118 of the second valve stem 110 is sized to journally fit in the upper aperture 94 of the valve body 72.

A rectangular end 120 is formed on the uppermost end portion of the second valve stem 110, and is shaped to matingly fit in the slot 52 of the first valve stem 48, thereby providing an interconnection therebetween. An elastomer 122, having an inner periphery 124 and opposite ends 126 and 128, is bonded to the walls of the bore 84, the chamfered portions 90 and 92 and the walls of the counterbores 86 and 88 of the valve body 72, and forms the seat for the valve unit 14. The inner periphery 124 of the elastomer 122 is sized to be slightly less in diameter than the outer periphery 100 of the butterfly member 98, so that the elastomer 122 will sealingly engage the butterfly valve member 98 when the butterfly member 98 is turned to the closed position, as shown in FIG. 2. The ends 126 and 128 of the elastomer 122 project axially outward beyond the ends 74 and 76 of the valve body 72, for reasons which will become apparent hereinafter.

The elastomer 122 surrounds and sealingly engages a portion of the second valve stem 110 to form a fluid tight seal between the second valve stem 110 and the valve body 72. More particularly, the surface 130 of the elastomer 122 sealingly engages the second valve stem 110 at a portion thereof generally adjacent the upper aperture 94 in the valve body 72, and the surface 132 of the elastomer 122 sealingly engages the second valve stem 110 at a portion thereof generally adjacent the lower aperture 96 and the valve body 72.

OPERATION OF FIGS. 1 AND 2

The valve unit 14 is assembled as a separate unit. The butterfly valve member 98 is inserted in the bore 84 of the valve body 72 to a position wherein the bore 104 through the butterfly member 98 is aligned with the upper and lower apertures 94 and 96 in the valve body 72. The second valve stem 110 is inserted downwardly through the upper aperture 94 of the valve body 72, and through the bore 104 of the butterfly member 98, to a position wherein the downwardly facing surface 114 of the second valve stem 110 engages the upwardly facing surface 108 of the bore 104. In this position, the lower portion 116 of the second valve stem 110 will extend through the lower aperture 96 in the valve body 72, and will be journaled therein. The upper portion 118 of the second valve stem 110 is journaled in the upper aperture 94 of the valve body 72, and the rectangular end 120 of the second valve stem 110 will extend beyond the outer periphery 78 of the valve body 72.

The first valve stem 48 is inserted upwardy through the aperture 42 in the housing 30 to a position wherein the flange portion 50 engages the downwardly facing surface 46 in the housing 30. The handle 54 is disposed over the upper portion of the first valve stem 48, and the pin 56 is inserted extending through the handle 54, and through the first valve stem 48.

The valve unit 14 is then inserted lengthwise into the bore 36 of the housing 30 to a position wherein the flange portion 80 of the valve body 72 abuts the wall 40 formed by the counterbore 38 in the housing 30. In this position, the rectangular portion 120 of the second valve stem 110 will be disposed in the slot 52 of the first valve stem 48. Since the outer periphery 78 of the valve body 72 is less in diameter than the periphery formed by the bore 36 in the housing 30, a chamber 134 will be formed between a portion of the valve body 72 and a portion of the housing 30 when the housing unit 14 is in an assembled position, as shown in FIGS. 1 and 2. The chamber 134 is sized to provide ample space to accommodate the rectangular end 120 of the second valve stem 110 and the lower flange portion 50 of the first valve stem 48. It should also be noted that since the chamber 134 is isolated from the fluid flowing through the valve assembly 10, as will be described hereinafter, the chamber 134 provides a space wherein steam may be injected, if the valve assembly 10 is to be used in an application requiring a valve of the steam jacketed type.

The flanges 16 and 18 are disposed on opposite ends of the housing unit 12 and the valve unit 14. In this position the end face 20 of the flange 16 will engage the end face 74 of the valve body 72, and the end face 22 of the flange 18 will engage the end face 34 of the housing 30 as well as the end 76 of the valve body 72. The valve assembly 10 is held in assembled relationship by the bolts 68, and is secured in this position by the nuts 70, as described hereinbefore.

As the nuts 70 are tightened on the bolts 68, the end faces 20 and 22 of the flanges 16 and 18 will engage the respective end faces 74 and 76 of the valve body 72. Since the ends 126 and 128 of the elastomer 122 extend axially beyond the end faces 74 and 76 of the valve body 72, it is apparent that the ends 126 and 128 of the elastomer 122 will be compressed by the flanges 16 and 18, and will sealingly engage the end faces 20 and 22 of the flanges 16 and 18, thereby preventing leakage of fluid therebetween. It is apparent from the foregoing that the elastomer 122, and particularly the end portions 126 and 128 thereof, will isolate the fluid flowing through the valve assembly 10 from the housing unit 12 and from the chamber 134 between the valve unit 14 and the housing unit 12.

The turning movement of the valve handle 54 is transmitted to the second valve stem 110 through the interconnection provided at the rectangular end 120 of the second valve stem 110 and the slot 52 of the first valve stem 48. This turning movement is then transmitted to the butterfly valve member 98 via the interconnection between the second valve stem 110 and the butterfly member 98 provided by the mating fit between the hexagonally shaped portion 106 of the bore 104 and the hexagonally shaped portion 112 of the second valve stem 110. The butterfly valve member 98 may thus be rotated from an open position to the closed position. When the butterfly valve member 98 is in the closed position, no fluid will flow through the valve since the outer periphery 100 of the butterfly member 98 will be in sealing engagement with the inner periphery 124 of the elastomer 122.

In all positions of the butterfly valve member 98, the fluid is isolated from the housing unit 12 by the elastomer 122 sealingly engaging the flanges 16 and 18 at the opposite ends of the valve body 72, and sealingly engaging the second valve stem 110. Since the components of the housing unit 12 will not be in contact with the fluid flowing through the valve, the housing unit 12 may be constructed of any material, such as cast iron or cast steel, the main consideration being strength and economical construction of the valve assembly. It should be further noted that the engagement of the end portion 50 of the first valve stem 48 with the surface 46 will provide a metal-to-metal seal in the event the elastomer 122 may be partially destroyed by fire.

It is apparent from the foregoing that the valve assembly 10 provides a valve assembly wherein the valve unit may be quickly and easily removed for repair or replacement. Since the only contacting area between the valve body 72 and the housing 30 is between the flange portion 80 of the valve body 72 and the counterbore 38 of the housing 30, the fact that a certain amount of corrosion may take place therebetween, in actual use of the valve assembly 10, will not greatly affect the ease with which the valve unit may be inserted and removed from the housing unit. It should also be noted that since a sliding fit is not required between the outer periphery 78 of the valve body 72 and the inner periphery formed by the bore 34 of the housing 30, the cost of manufacturing the valve assembly is correspondingly reduced.

The unitary structure of the second valve stem 110 assures quick and easy assembly or disassembly of the butterfly valve member 98. Since the second valve stem 110 is of a unitary structure, and further since it is inserted through a bore in the butterfly valve member 98, the interconnection between the second valve stem 110 and the butterfly valve member 98 may be of a stronger, more sturdy construction, which is particularly important in some service conditions. This type of structure also reduces the cost of manufacture, since the second valve stem 110 is secured to the butterfly valve member 98 by simply inserting the second valve stem 110 downwardly through a bore in the butterfly valve member.

The mating hexagonally shaped portions of the bore in the butterfly valve member 98 and the second valve stem 110 provide an interconnection between the second valve stem 110 and the butterfly valve member 98 which assures positive alignment of the butterfly valve member 98, and yet is quickly and easily assembled or removed, thereby facilitating manufacture and field repairs.

The valve assembly described hereinbefore also provides a valve assembly wherein the valve unit is insertable and removable for repair or replacement, and yet is suitable for applications requiring a valve of the steam jacketed type.

EMBODIMENTS OF FIGS. 3 AND 4

The valve assembly 10a shown in FIGS. 3 and 4, is constructed exactly like the valve assembly 10, shown in FIGS. 1 and 2, except as hereinafter described.

The valve body 72a has a bore 136 which extends therethrough and intersects the opposite end faces 74a and 76a thereof. A counterbore 138 is formed in the valve body 72a, and extends a distance therethrough intersecting the end face 74a of the valve body 72a. A chamfered potrion 140 is formed in the valve body 72a, intersecting the end face 74a and the counterbore 138 thereof. The upper and lower apertures 94a and 96a extend through the valve body 72a and intersect the counterbore 138.

The axial length of the valve body 72a, as measured from the end 74a axialy to the end 76a, is less than the axial length of the housing 30, as measured from the end 32 axially to the end 34. Therefore, when the valve unit is in an assembled position, as shown more clearly in in FIG. 3, the valve body 72a will extend only a distance into the bore 36 of the housing 30.

An elastomer 142 is bonded to the walls of the counterbore 138 and the chamfered portion 140 in the valve body 72a, and forms the seat for the butterfly valve member 98 in the same manner as the elastomer 122 in the valve assembly 10 previously described. The end 144 of the elastomer 142 is sized to sealingly engage the end face 20 of the flange 16 when the valve assembly 10a is in the assembled position. The surfaces 146 and 148 of the elastomer 142 will sealingly engage the second valve stem 110 at portions thereof generally adjacent the upper and lower apertures 94a and 96a, in a manner exactly like the surfaces 130 and 132 of the elastomer 122.

A seal gasket 150 is disposed between the end face 34 of the housing 30 and the end face 22 of the flange 18, and forms a fluid tight seal therebetween when the valve assembly 10a is in the assembled position.

In the valve assembly 10a it is also desirable to provide an O-ring seal 136 in a mating groove 138 in the body aperture 42 to provide a seal around the first valve stem 48.

OPERATION OF FIGS. 3 AND 4

The valve assembly 10a will operate basically like the valve assembly 10 shown in FIGS. 1 and 2.

The valve unit 14a is assembled as a separate unit by inserting the butterfly valve member 98 in the counterbore 138 of the valve body 72a, to a position wherein the bore 104 in the butterfly valve member 98 is aligned with the upper and lower apertures 94a and 96a in the valve body 72a. The second valve stem 110 is then inserted downwardly through the upper aperture 94a, through the bore 104 and through the lower aperture 96a. The second valve stem 110 is therefore interconnected to the butterfly valve member 98, and is journaled in the valve body 72a in a manner exactly like the valve assembly 10 shown in FIGS. 1 and 2.

The valve unit 14a is then inserted in the housing unit 12 and the first and second valve stems 48 and 110 are interconnected in the same manner as in the valve assembly 10. The salient difference between the valve assembly 10 and the valve assembly 10a is that the end face 76a is not coplanar with the end face 34 of the housing 30 when the valve assembly 10a is in the assembled position, as was the end face 76 and the end face 34 in the valve assembly 10.

The seal gasket 150 is disposed adjacent the end face 34 of the housing 30 and the end face 22 of the flange 18 is assembled adjacent the seal gasket 150. The flange 16 is disposed adjacent the end face 74a of the valve body 72a, and the flanges 16 and 18, the valve unit 14, and the housing unit 12 are secured in an assembled relationship by the bolts 68 and the nuts 70.

When the butterfly valve member 98 is turned to the closed position, as shown in FIG. 4, no fluid will flow through the valve since the elastomer 142 is sized to sealingly engage the butterfly valve member 98. The end 144 of the elastomer 142 provides a fluid tight seal between the end face 20 of the flange 16 and the valve unit 14a, and the seal gasket 150 provides a fluid tight seal between the end face 22 of the flange 18 and the housing unit 12.

It is apparent from the foregoing that the valve assembly 10a retains all of the advantages of the valve assembly 10 with respect to the particular construction of the second valve stem and the butterfly valve member, and with respect to the inner periphery of the bore in the housing being sized larger than the outer periphery of the valve body. However, in this embodiment of the invention, shown in FIGS. 3 and 4, the housing unit 12 is not isolated from the fluid flowing through the valve assembly.

Changes may be made in the construction and arrangement of parts or elements of the various embodiments as disclosed herein without departing from the spirit and scope of the invention.

What is claimed is:

1. A valve assembly for controlling the flow of fluid between a pair of aligned pipe flanges interconnected by a plurality of circumferentially spaced bolts, comprising:
   a housing unit, including:
      a housing having opposite end faces and a bore extending therethrough, said housing adapted to be supported between said flanges by said bolts;
      valve operating means supported by the housing; and
   a valve unit, including:
      a valve body adapted to be inserted lengthwise into the housing and supported thereby, having opposite ends and a bore extending therethrough intersecting said opposite ends and being substantially parallel to the housing bore, the major portion of the outer periphery of said valve body being sized to be substantially less in diameter than the inner periphery formed by the bore in the housing so that when the valve body is inserted in the housing a chamber will exist between the valve body and the housing;
      a butterfly valve member supported in the bore of the valve body for opening and closing the valve assembly;
      a valve stem securedly connected to the butterfly valve member, having an upper and a lower end portion journaled in the valve body, said upper end portion being adapted to be connected to the valve operating means for transmitting the movement of the valve operating means to the butterfly valve member; and
      seat means providing a seal between the valve body and the butterfly valve member when the butterfly valve member is in the closed position.

2. The valve assembly of claim 1 wherein the housing includes a flange portion extending outwardly around a portion of the outer periphery of said housing, said flange portion having a plurality of holes provided therethrough to accommodate some of said bolts.

3. The valve assembly of claim 2 wherein the flange portion is provided with not more than two holes to accommodate said bolts and the remaining bolts extend around the outer periphrey of said housing.

4. The valve assembly of claim 1 defined further to include a valve operator supported by the housing, and wherein the valve operating means includes a first valve stem journaled in the housing, having an upper and a lower end portion, the upper end portion of the first valve stem being adapted to be connected to said valve operator and the lower end portion of the first valve stem being adapted to be connected to the valve stem in the valve body.

5. The valve assembly of claim 4 wherein the lower end portion of the first valve stem has a slot therethrough, and wherein the upper end portion of the valve stem in the first valve body is sized to matingly and interconnectingly fit in said slot when valve unit is inserted in the housing.

6. The valve assembly of claim 4 wherein the center line of the first valve stem extends at a right angle to the center line of the bore in the housing.

7. The valve assembly of claim 1 wherein the butterfly valve member includes a bore extending therethrough, and wherein the valve stem in the valve body is sized to be inserted through the bore in the butterfly valve member.

8. The valve assembly of claim 7 wherein a portion of the bore in the butterfly valve member has a generally hexagonally shaped cross section, and wherein a portion of the valve stem in the valve body has a generally hexagonally shaped cross section sized to matingly fit the hexagonally shaped cross section in said bore, thereby providing the interconnection therebetween.

9. The valve assembly of claim 8 wherein the hexagonally shaped portion of the bore in the butterfly valve member forms an upwardly facing surface in said bore, and wherein the hexagonally shaped portion of the valve stem in the valve body forms a generally downwardly facing surface, said upwardly and downwardly facing surface being sized and positioned to matingly engage when said valve stem is inserted in said bore in the butterfly valve member, thereby limiting the downward movement of said valve stem in said bore.

10. The valve assembly of claim 1 wherein the valve body includes a flange portion extending radially therefrom, said flange portion being sized to contact said housing, and thereby support the valve body in the housing.

11. The valve assembly of claim 1 wherein the housing includes a counterbore adjacent one end thereof; and wherein the valve body includes a flange portion on one end thereof extending radially therefrom, said flange portion being sized to matingly fit in said counterbore, thereby positioning the valve body in the housing.

12. The valve assembly of claim 1 wherein the valve body includes a flange portion having an end face surface extending radially therefrom, said flange portion being adapted to cooperate with said housing and one of said flanges to support and position the valve body in the housing.

13. The valve assembly of claim 12 wherein said flange portion is sized such that the end face surface thereof facing away from the valve body protrudes beyond the adjacent end face of the housing when the valve body is inserted in the housing.

14. The valve assembly of claim 13 wherein the length of the valve body between the end face surface of the flange portion and the opposite end face of the valve body is greater than the length of the housing between the opposite ends thereof.

15. The valve assembly of claim 14 wherein the length of the valve body is sized such that when the valve body is inserted in the housing the end of the valve body opposite the flange portion end is coplanar with the respective end of the housing.

16. The valve assembly of claim 15 wherein the seat means includes an elastomer bonded around the inner periphery of the valve body, having a portion thereof shaped to sealingly engage the butterfly valve member is in the closed position, and wherein the seat means extends over a portion of the flange portion of the valve body, and over a portion of the opposite end of the valve body and sealingly engages the adjacent flanges, thereby isolating the housing unit from the fluid flowing through the valve body.

17. The valve assembly of claim 13 wherein the length of the valve body between the end face surface of the flange portion and the opposite end face of the valve body is less than the length of the housing between the opposite ends thereof.

18. The valve assembly of claim 17 wherein the seat means includes an elastomer bonded around the inner periphery of the valve body having a portion thereof shaped to sealingly engage the buttery valve member when the butterfly valve member is in the closed position, and wherein the seat means extends over a portion of the flange portion of the valve body and sealingly engages the adjacent flange.

19. The valve assembly of claim 18 defined further to include a seal gasket disposed between the end of the housing opposite the end of the housing in contact with the flange portion of the valve body, thereby forming a fluid tight seal therebetween.

20. The valve assembly of claim 1 wherein the seat means includes an elastomer bonded around the inner periphery of the valve body, having a portion thereof shaped to sealingly engage the butterfly valve member when the butterfly valve member is in the closed position.

21. A valve assembly for controlling the flow of fluid through adjacent pipe sections comprising;
a housing unit, including:
a housing having opposite end faces and a bore extending therethrough;
means supporting the housing between the adjacent ends ofthe pipe sections;
valve operating means supported by the housing; and
a valve unit, including:
a valve body having opposite ends and a bore extending therethrough intersecting said opposite ends and being substantially parallel to the housing bore, said valve body being adapted to be inserted lengthwise into the housing and supported thereby;
a butterfly valve member supported in the bore of the valve body for opening and closing the valve assembly, and having a bore extending therethrough;
a valve stem having an upper and a lower end portion, sized to be inserted through the bore in the butterfly valve member, and having the upper and lower end portions journaled in the valve body, said upper end portion being adapted to be connected to the valve operating means for transmitting the movement of the valve operating means to the butterfly valve member; and
seat means providing a seal between the valve body and the butterfly valve member when the butterfly valve member is in the closed position.

22. A valve assembly for controlling the flow of fluid through adjacent pipe sections comprising:
a housing unit, including:
a housing having opposite end faces and a bore extending therethrough;
means supporting the housing between the adjacent ends of the pipe sections;
valve operating means supoprted by the housing; and
a valve unit, including:
a valve body adapted to be inserted lengthwise into the housing and supported thereby, having opposite ends and a bore extending therethrough intersecting said opposite ends and being substantially parallel to the housing bore, the major portion of the outer periphery of said valve body being sized to be substantially less in diameter than the inner periphery formed by the bore in the housing so that when the valve body is inserted in the housing a chamber will exist between the valve body and the housing;

a butterfly valve member supported in the bore of the valve body for opening and closing the assembly;

a valve stem connected to the butterfly valve member, having an upper and a lower end portion journaled in the valve body, said upper end portion being adapted to be connected to the valve operating means for transmitting the movement of the valve operating means to the butterfly valve member; and seat means providing a seal between the valve body and the butterfly valve member when the butterfly valve member is in the closed position.

References Cited

UNITED STATES PATENTS

| | | | |
|---|---|---|---|
| 2,092,261 | 9/1937 | Rector | 251—291 X |
| 3,118,465 | 1/1964 | Scaramucci | 251—308 X |
| 3,127,904 | 4/1964 | Stillwagon | 251—308 X |
| 3,348,804 | 10/1967 | Piccardo | 251—367 X |

WILLIAM R. CLINE, Primary Examiner

U.S. Cl. X.R.

251—306

PO-1050
(5/69)

UNITED STATES PATENT OFFICE
CERTIFICATE OF CORRECTION

Patent No. 3,531,082    Dated September 29, 1970

Inventor(s) Domer Scaramucci

It is certified that error appears in the above-identified patent and that said Letters Patent are hereby corrected as shown below:

Column 9, line 69 after "valve member" insert --when the butterfly valve member--

Column 10, line 9 "buttery valve" should be --butterfly valve--

SIGNED AND SEALED
JAN 26 1971

(SEAL)
Attest:

Edward M. Fletcher, Jr.
Attesting Officer

WILLIAM E. SCHUYLER, JR.
Commissioner of Patents